United States Patent
Golshan et al.

(10) Patent No.: US 11,741,312 B2
(45) Date of Patent: Aug. 29, 2023

(54) SYSTEMS AND METHODS FOR UNSUPERVISED PARAPHRASE MINING

(71) Applicant: Recruit Co., Ltd., Tokyo (JP)

(72) Inventors: Behzad Golshan, Mountain View, CA (US); Chen Chen, Sunnyvale, CA (US); Wang-Chiew Tan, San Jose, CA (US); Danni Ma, Philadelphia, PA (US)

(73) Assignee: RECRUIT CO., LTD., Tokyo (JP)

( * ) Notice: Subject to any disclaimer, the term of this patent is extended or adjusted under 35 U.S.C. 154(b) by 242 days.

(21) Appl. No.: 17/008,563

(22) Filed: Aug. 31, 2020

(65) Prior Publication Data
US 2022/0067298 A1    Mar. 3, 2022

(51) Int. Cl.
G06F 40/35 (2020.01)
G06F 40/268 (2020.01)
G06F 40/284 (2020.01)
G06F 18/2323 (2023.01)

(52) U.S. Cl.
CPC .......... *G06F 40/35* (2020.01); *G06F 18/2323* (2023.01); *G06F 40/268* (2020.01); *G06F 40/284* (2020.01)

(58) Field of Classification Search
CPC ...... G06F 40/35; G06F 40/268; G06F 40/284; G06F 40/30; G06K 9/6224
See application file for complete search history.

(56) References Cited

U.S. PATENT DOCUMENTS

| | | | |
|---|---|---|---|
| 2006/0106592 A1* | 5/2006 | Brockett | G06F 40/237 704/1 |
| 2008/0046229 A1* | 2/2008 | Maskey | G06F 40/289 704/2 |

(Continued)

FOREIGN PATENT DOCUMENTS

| | | |
|---|---|---|
| JP | 2005234800 | 9/2005 |
| JP | 2007233446 | 9/2007 |
| JP | 2018185661 A | * 11/2018 |

OTHER PUBLICATIONS

Chen, L., Paritosh, P., Rajendran, V., & Forbus, K. D. (2016). Learning paraphrase identification with structural alignment. IJCAI International Joint Conference on Artificial Intelligence, Jan. 2016, 2859-2865. (Year: 2016).*

(Continued)

*Primary Examiner* — Bhavesh M Mehta
*Assistant Examiner* — Philip H Lam
(74) *Attorney, Agent, or Firm* — Finnegan, Henderson, Farabow, Garrett & Dunner, LLP

(57) ABSTRACT

Disclosed embodiments relate to aligning pairs of sentences. Techniques can include receiving a plurality of sentences; generating a graph for each of at least two sentences of the plurality of sentences, wherein generating a graph for each sentence of the at least two sentences comprises: identifying one or more tokens for the sentence; and connecting via edges the one or more tokens; generating a combined graph for the at least two sentences wherein generating a combined graph comprises: aligning the identified tokens of the at least two sentences of the plurality of sentences; identifying matching and non-matching tokens between the at least two sentences based on the alignment; and merging matching tokens into a combined graph node.

20 Claims, 8 Drawing Sheets

(56) References Cited

U.S. PATENT DOCUMENTS

2020/0293623 A1* 9/2020 Saito .................. G06F 40/53
2021/0201143 A1* 7/2021 Choi ................... G06N 3/0454

OTHER PUBLICATIONS

Regina Barzilay and Lillian Lee. 2003. Learning to Paraphrase: An Unsupervised Approach Using Multiple-Sequence Alignment. In Proceedings of the 2003 Human Language Technology Conference of the North American Chapter of the Association for Computational Linguistics, pp. 16-23. (Year: 2003).*

Katja Filippova. 2010. Multi-Sentence Compression: Finding Shortest Paths in Word Graphs. In Proceedings of the 23rd International Conference on Computational Linguistics (Coling 2010), pp. 322-330, Beijing, China. Coling 2010 Organizing Committee. (Year: 2010).*

Xi-bin Jia, Ya Jin, Ning Li, Xing Su, Barry Cardiff, Bir Bhanu. Words alignment based on association rules for cross-domain sentiment classification[J].Frontiers of Information Technology & Electronic (Year: 2018).*

Bo Pang, Kevin Knight, and Daniel Marcu. 2003. Syntax-based alignment of multiple translations: extracting paraphrases and generating new sentences. In Proceedings of the 2003 Conference of the North American Chapter of the Association for Computational Linguistics on Human Language Technology (Year: 2003).*

Qader, R., Lecorvé, G., Lolive, D., Sébillot, P. (2018). Disfluency Insertion for Spontaneous TTS: Formalization and Proof of Concept. In: Dutoit, T., Martín-Vide, C., Pironkov, G. (eds) Statistical Language and Speech Processing. SLSP 2018. Lecture Notes in Computer Science( ), vol. 11171. Springer (Year: 2018).*

De Marneffe, M. C., Rafferty, A. N., & Manning, C. D. (Jun. 2008). Finding contradictions in text. In Proceedings of acl-08: Hlt (pp. 1039-1047). (Year: 2008).*

Xu, S., Shen, X., Fukumoto, F., Li, J., Suzuki, Y., & Nishizaki, H. (2020). Paraphrase identification with lexical, syntactic and sentential encodings. Applied Sciences, 10(12), 4144. (Year: 2020).*

PCT International Search Report and Written Opinion corresponding with PCT/JP2021/030379, dated Nov. 22, 2021. (8 pages).

Suzuki et al., "Synonym Acquisition for Biomedical Thesaurus Expansion: a Graph-based Approach," IPSJ SIG Technical Reports, Jan. 15, 2009, vol. 2009 No. 2, pp. 65-70 (8 pages).

* cited by examiner

SYSTEMS AND METHODS FOR UNSUPERVISED PARAPHRASE MINING

BACKGROUND

Improvement of natural language processing systems to allow computers to respond to natural languages is a challenging task. The task becomes increasingly difficult when machines attempt to understand languages and phrases specific to domains and based on limited amounts of data. There is a need for techniques and systems which can easily adapt to domain specific information to respond to the needs of modern natural language systems.

SUMMARY

Certain embodiments of the present disclosure relate to a non-transitory computer readable storage medium storing instructions that are executable by a paraphrase mining system that includes one or more processors to cause the paraphrase mining system to perform a method for aligning pairs of sentences. The method can include receiving a plurality of sentences, generating a graph for each of at least two sentences of the plurality of sentences, wherein generating a graph for each sentence of the at least two sentences comprises: identifying one or more tokens for the sentence, and connecting via edges the one or more tokens, generating a combined graph for the at least two sentences wherein generating a combined graph comprises: aligning the identified tokens of the at least two sentences of the plurality of sentences, identifying matching and non-matching tokens between the at least two sentences based on the alignment, and merging matching tokens into a combined graph node.

According to some disclosed embodiments, generating a combined graph for the at least two sentences can further include determining compatibility among the at least two sentences, and removing sentences from the at least two sentences based on the compatibility determination.

According to some disclosed embodiments, determining compatibility among the at least two sentences can include determining injectivity among the at least two sentences, determining monotonicity among the at least two sentences, and determining transitivity among the at least two sentences.

According to some disclosed embodiments, determining monotonicity among the at least two sentences can further include determining a consistency among the at least two sentences, and removing sentences from the at least two sentences based on the consistency determination.

According to some disclosed embodiments, receiving a plurality of sentences can further include determining an intent of each sentence in a set of the plurality sentences, and grouping each sentence in the set of the plurality of sentences into clusters wherein sentences in a cluster share the intent.

According to some disclosed embodiments, generating a combined graph for the at least two sentences can further include determining an intent of tokens in the at least two sentences, and identifying a set of non-matching tokens between the at least two sentences based on the alignment wherein the non-matching tokens in the set share the intent.

According to some disclosed embodiments, the non-matching tokens can be paraphrases with one or more words that can be used interchangeably.

According to some disclosed embodiments, non-aligned tokens can be phatic expressions.

According to some disclosed embodiments, the phatic expressions in each sentence of the two or more sentences can be removed before generating a combined graph.

According to some disclosed embodiments, the phatic expressions can be added to the combined graph notation of the two more sentences after aligning the identified tokens.

According to some disclosed embodiments, the method can further include generating a new sentence from the matching tokens and a subset of the non-matching tokens.

According to some disclosed embodiments, the new sentence is generated as a response to a question.

Certain embodiments of the present disclosure relate to computer implemented method for aligning pairs of sentences. The method can include receiving a plurality of sentences, generating a graph for each of at least two sentences of the plurality of sentences, wherein generating a graph for each sentence of the at least two sentences comprises: identifying one or more tokens for the sentence, and connecting via edges the one or more tokens, generating a combined graph for the at least two sentences wherein generating a combined graph comprises: aligning the identified tokens of the at least two sentences of the plurality of sentences, identifying matching and non-matching tokens between the at least two sentences based on the alignment, and merging matching tokens into a combined graph node.

According to some disclosed embodiments, generating a combined graph for the at least two sentences can further include determining compatibility among the at least two sentences, and removing sentences from the at least two sentences based on the compatibility determination.

According to some disclosed embodiments, determining compatibility among the at least two sentences can include determining injectivity among the at least two sentences, determining monotonicity among the at least two sentences, and determining transitivity among the at least two sentences.

According to some disclosed embodiments, generating a combined graph for the at least two sentences can further include determining a consistency among the at least two sentences, and removing sentences from the at least two sentences based on the consistency determination.

Certain embodiments of the present disclosure relate to a paraphrase mining system. The paraphrase mining system can include one or more memory devices storing processor executable instructions, and one or more processors configured to execute the instructions to cause the paraphrase mining system to perform operations. The operations can include receiving a plurality of sentences, generating a graph for each of at least two sentences of the plurality of sentences, wherein generating a graph for each sentence of the at least two sentences comprises: identifying one or more tokens for the sentence, and connecting via edges the one or more tokens, generating a combined graph for the at least two sentences wherein generating a combined graph comprises: aligning the identified tokens of the at least two sentences of the plurality of sentences, identifying matching and non-matching tokens between the at least two sentences based on the alignment, and merging matching tokens into a combined graph node.

According to some disclosed embodiments, the operations can further include determining an intent of each sentence in a set of the plurality sentences, and grouping each sentence in the set of the plurality of sentences into clusters wherein sentences in a cluster share the intent.

According to some disclosed embodiments, the operations can further include determining an intent of tokens in the at least two sentences.

According to some disclosed embodiments, the operations can further include generating a new sentence from the matching tokens and a subset of the non-matching tokens.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous details are set forth to provide a thorough understanding of the disclosed example embodiments. It is understood by those skilled in the art that the principles of the example embodiments may be practiced without every specific detail. The embodiments disclosed are exemplary and are intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Figure 7A:
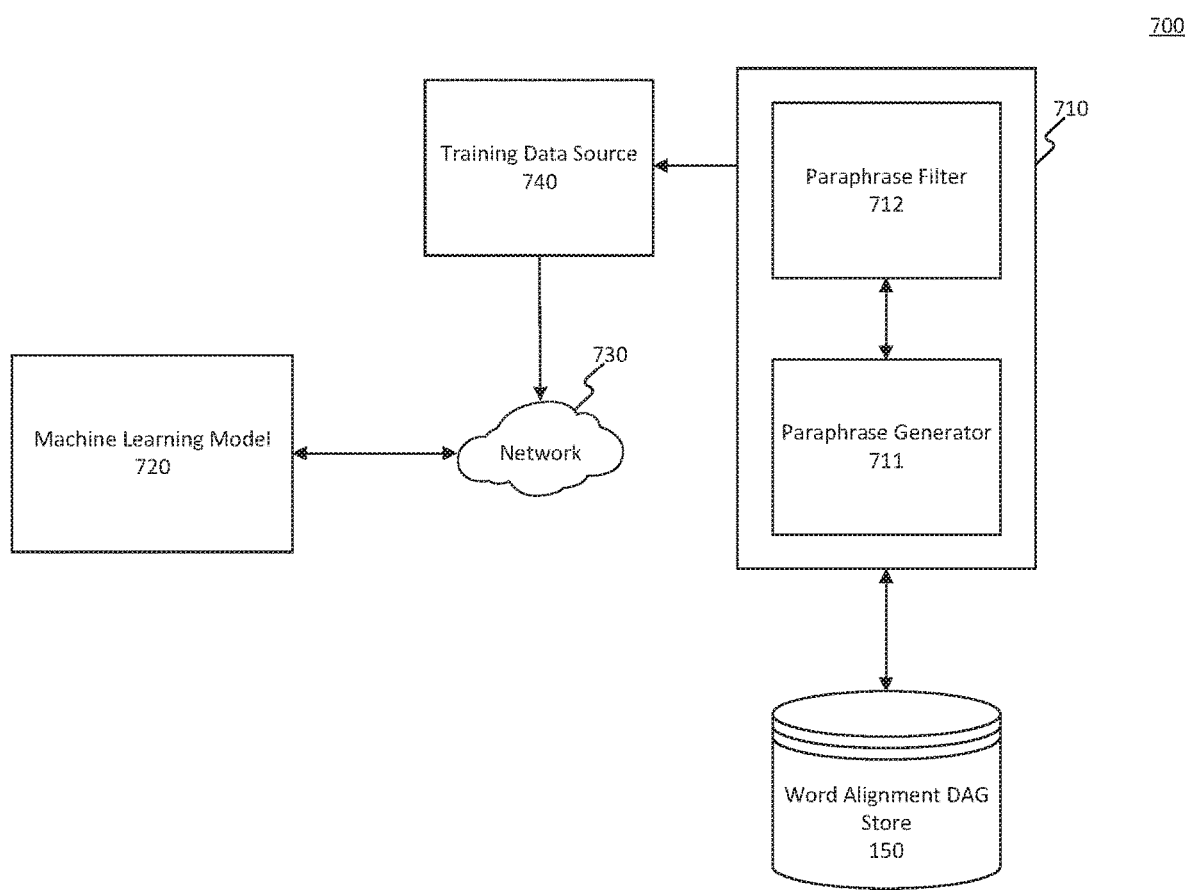
FIG. 7A illustrates an exemplary paraphrase mining system, consistent with embodiments of the present disclosure.
Figure 7B:
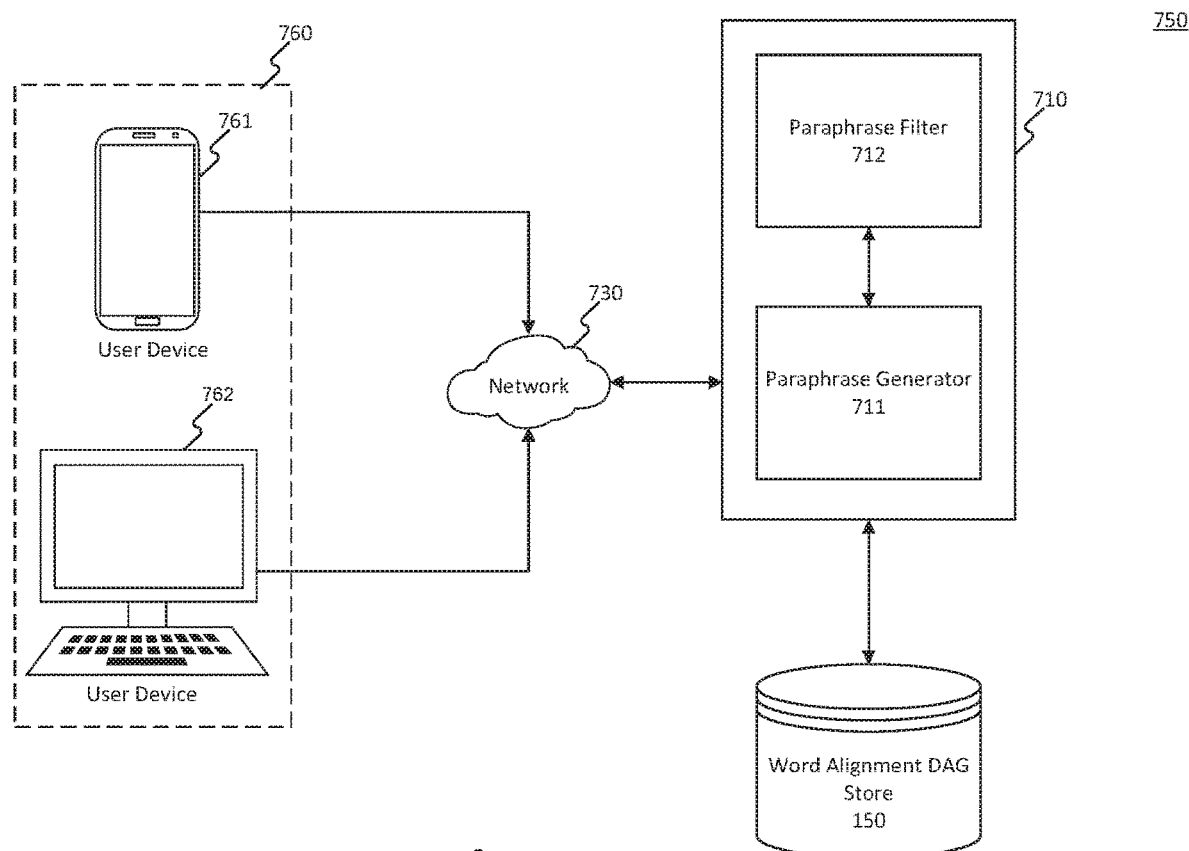
FIG. 7B illustrates an exemplary paraphrase mining system, consistent with embodiments of the present disclosure, according to some embodiments of the present disclosure.

The embodiments described herein provide technologies and techniques for evaluating data sources to identify alignment and mining of paraphrases for improving natural language processing by computing systems. These technologies can use information relevant to the specific domain and application of a data model to prioritize available data or potential data sources. FIGS. 7A-7B describe various data sources accessed or chosen to utilize based on the results of various systems described below. The described technologies can synthesize the data into a coherent data model, that can be used to analyze and compare various paths or courses of action.

These technologies can efficiently evaluate data sources and data, prioritize their importance based on domain and circumstance specific needs, and provide effective and accurate predictions that can be used to evaluate potential courses of action. The technologies and methods allow for the application of data models to personalized circumstances. These methods and technologies allow for detailed evaluation that can improve decision making on a case by case basis.

The described embodiments provide a distinct advantage over existing techniques of natural language processing. Unlike most other processes, the graph-based system described in the disclosed embodiments operate in an unsupervised manner. Additionally, the described embodiments can provide useful insights even with small amounts of data or data that is tied to a particular domain which provides distinct advantages over statistical methods that only work on general purpose phrases and require significantly larger data sets to be effective. By focusing on generating consistent groupings of sentences that share common intent, the embodiments disclosed herein can effectively identify interchangeable phrases sharing the same topic or intent. The ability to do this can provide significant advantages in natural language processing systems that must respond to different individuals or questions that often ask the same thing but in different ways. By allowing for unsupervised, efficient identification of domain specific phrases, the embodiments disclosed herein can provide an improved ability to use natural language processing in various industries and particularized contexts without the need for extensive customization and modification.

Figure 1:
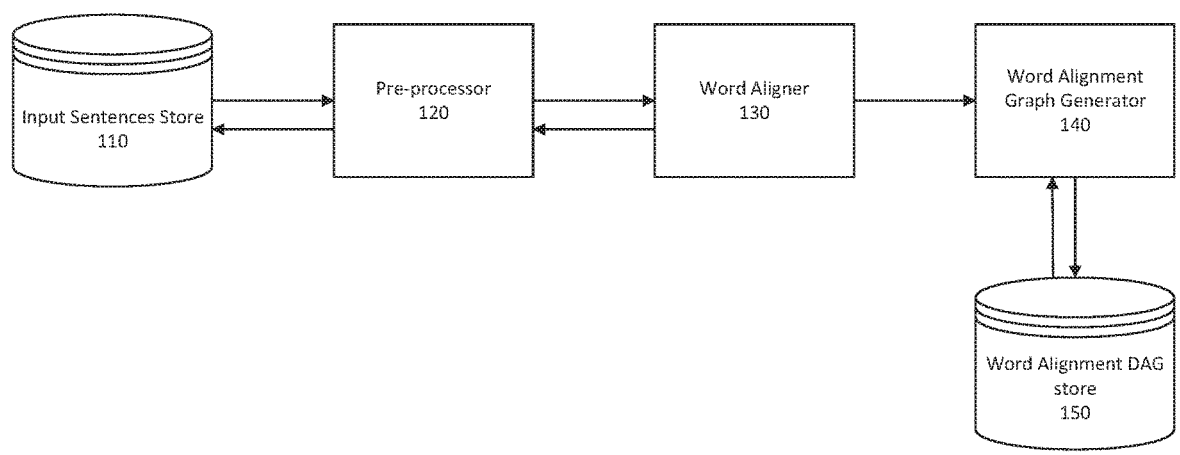
FIG. 1 is a block diagram showing various exemplary components of a paraphrase mining system for generating word alignment graphs, consistent with embodiments of the present disclosure.

FIG. 1 is a block diagram showing various exemplary components of paraphrase mining system 100 for generating word alignment graphs, consistent with embodiments of the present disclosure. The paraphrase mining system 100 can comprise an input sentences store 110 that can be pre-populated using a corpus of sentences. In some embodiments, the input sentences store 110 saves a set of input sentences supplied by a user before passing them to other components of paraphrase mining system 100. In some other embodiments, the sentences in the input sentences store 110 can be supplied by separate system. In some embodiments, input sentences store can include sentences supplied by user input, other systems, other data sources, or feedback from paraphrase mining system 100 or its components. Input sentences store 110 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access of related records stored in disparate tables. For example, in an RDBMS, tables can be linked by a referential column and the RDBMS can join tables together to retrieve data for a data structure. In some embodiments, the input sentences store 110 can be a non-relational database system (NRDBMS) (e.g., XML, Cassandra, CouchDB, MongoDB, Oracle NoSQL Database, FoundationDB, or Redis). A non-relational database system can store data using a variety of data structures such as, among others, a key-value store, a document store, a graph, and a tuple store. For example, a non-relational database using a document store could combine all of the data associated with a particular identifier into a single document encoded using XML. The input sentences store 110 can also be a memory database such as Memcached. In some embodiments, the contents of input sentences store 110 may exist both in a persistent storage database and in an in-memory database, such as is possible in Redis.

In natural language processing systems, such as paraphrase mining system 100, paraphrases can be different words or groupings of words that have a similar meaning. Paraphrase mining system 100 can identify paraphrases in the input sentences using an unsupervised, graph-based system, or process. Paraphrase mining system 100 can align words from input sentences in input sentences store 110 (e.g., using pre-processor 120, word-aligner 130, or both, as described in more detail below). Using the aligned words and phrases, paraphrase mining system 100 can further generate a word-alignment graph (e.g., using word-alignment graph generator 140, described in more detail below) to identify phrases and words that can be used interchangeably. The identified paraphrases can be used interchangeably in creating new sentences. The identification of paraphrases can also aid in dropping or eliminating certain phrases from existing sentences without impacting the meaning of those sentences. Such phrases have no paraphrases in other sentences and thus may be regarded as non-essential for the meaning of the sentence and dropped when preparing sentences. By identifying paraphrases in this way, paraphrase mining system 100 can also identify domain-specific paraphrases that would not otherwise be identified through existing statistical methods focused on identifying general-purpose paraphrases. Moreover, paraphrase mining system 100, outlined above, and described in more detail below, can generate paraphrases from data sets that are generally considered too small for use in existing systems.

As illustrated in FIG. 1, paraphrase mining system 100 can include pre-processor 120. Pre-processor 120 can process input sentences in input sentences store 110 prior to aligning the words and phrases in the sentences. In some embodiments, pre-processor 120 receives some or all of the input sentences directly instead of loading them from input sentences store 110. Pre-processor 120 can skip processing certain input sentences before passing them to the word aligner 130 based on predefined criteria. The predefined criteria may include sentences longer than a certain length. The length can be determined by the number of characters, words, or phrases. In some embodiments, the length can be determined by the amount of screen space taken to present the sentence. In some embodiments, the pre-defined criteria can vary with the language of the input sentences. Pre-defined criteria can also be excluding grammatically incorrect sentences, including incomplete sentences or misspellings, missing punctuation, or sentence abnormalities. The predefined criteria can be set utilizing a graphical user interface. The predefined criteria can be set individually by each user of the system or by the administration of the system. The predefined criteria can be automatically determined based on the input sentences corpus or the language of the input sentences. In some embodiments, pre-processor 120 can store the processed input sentences in input sentences store 110 for later use.

Pre-processor 120 can prepare input sentences for further processing. The processing by pre-processor 120 can include replacing numbers and named entities with symbols or tokens. For example, numbers can be replaced by "NUM" and named entities can be replaced with "ORG." Pre-processor 120 can further generate the relationship between the processed input sentence and the original sentence. In some embodiments, pre-processor 120 can identify the relationship between a group of input sentences. Pre-processor 120 can also store the identified relationship between a group of input sentences in the input sentences store 110. A relationship can be maintained in a hash table with the replacing symbol or token as the key mapping to the named entity, which may act as the value. The hash tables maintaining relationships can be stored in persistent storage, such as the input sentences store 110. The relationships can be stored in a separate database or tables from the database or tables storing input sentences.

The paraphrase mining system 100 can include word aligner 130 to align words between sentences. Word aligner 130 can receive input sentences from pre-processor 120. In some embodiments, word aligner 130 can directly access the input sentences store 110 to retrieve a set of input sentences for alignment. Word aligner 130 can select an input sentence from the input sentences store 110 based on defined requirements. Method 300 discussed below describes some ways for selecting input sentences for alignment. Word aligner 130 can operate on a pair of sentences and generate predicted mappings between the tokens of those sentences. Word aligner 130 can result in sets of aligned and non-aligned words that can then be used for further analysis. In some embodiments, word aligner 130 can iterate through all possible sentence pairs to find proper alignment between the set of input sentences.

Word aligner 130 can divide the input sentences into tokens prior to the alignment. Word aligner 130 can align the tokens identified in the input sentences. Word aligner 130 can use word embeddings to identify an alignment between identified tokens. Word embeddings can refer to a learned representation of words that have the same or similar meanings. Word embeddings can include glove embeddings. In some embodiments, the word embeddings may be contextual embeddings that are computed using a neural network architecture such as, for example, BERT and ELMO, etc. In some embodiments, the word aligner 130 can also use general-purpose paraphrases and lexical resources to identify alignment between the identified tokens.

Word aligner 130 can align a pair of input sentences if they have a certain number of tokens within them that can align. Word aligner 130 can also consider the proximity between tokens when aligning sentences. The proximity between the tokens can be based on word embeddings associated with the tokens in the input sentences. The threshold for the number of tokens expected to align or the allowed proximity level between the tokens can be set in the paraphrase mining system 100. The levels can be updated upon every alignment request by a user or periodically by paraphrase mining system 100. In some embodiments, the threshold is chosen based on a determined quality of the input sentences or the purpose of aligning input sentences. Accordingly, the target use case for paraphrase mining system 100 can affect the threshold value.

Paraphrase mining system 100 can also include word alignment graph generator 140 for creating directed acyclic graphs (DAGs) of all aligned sentences. The word aligner 130 may supply all aligned sets of input sentences to word alignment graph generator 140. In some embodiments, combinations of sentences with minimum word alignment can be withheld from word alignment graph generator 140. The minimum word alignment is configurable. Word alignment graph generator can create a new DAG using an existing DAG and a set of word-aligned input sentences. Word alignment graph generator 140 can retrieve existing DAGs from word alignment DAG store 150. Word alignment DAG store 150 can store newly created DAGs generated by word alignment graph generator 140 as well as DAGs created by other processes or iterations of paraphrase mining system 100. Word alignment DAG store 150 may be a database or a flat file system. As described above in reference to input sentences store 110, word alignment DAG store 150 can be an RDBMS, an NRDBMS, or other type of data store. In some embodiments, the word alignment DAG store 150 may be stored on the same database as input sentences store 110.

In some embodiments, paraphrase mining system 100 may translate the input sentences to a uniform language prior to the alignment of sentences. Pre-processor 120 can transform the input sentences. Paraphrase mining system 100 can detect the language of the system to determine if translation is required. In some embodiments, the word aligner 130 can align sentences in different languages using word embeddings available in different languages. Word aligner 130 can request that pre-processor 120 process parts of the input sentence or sentences prior to alignment. Word aligner 130 can request that pre-processor 120 process a pair of sentences. In some embodiments, word aligner 130 requests this alignment even if the sentences do not meet the alignment thresholds for word aligner 130. The components of the paraphrase mining system 100 may interact with one or more other components of paraphrase mining system 100 or other systems to determine the best alignment of the input sentences. The alignment process for the input sentences is discussed in detail below in reference to method 500.

The components of paraphrase mining system 100 can run on a single computer or may be distributed across multiple computers or processors. The different components of paraphrase mining system 100 can communicate over a network (e.g., LAN or WAN) or the Internet. In some embodiments, each component can run on multiple computer instances or processors. The instances of each component of the paraphrase mining system 100 can be a part of a connected network such as a cloud network (e.g., Amazon AWS, Microsoft Azure, Google Cloud). In some embodiments, some, or all, of the components of paraphrase mining system 100 are executed in virtualized environments such as a hypervisor or virtual machine.

Figure 2:
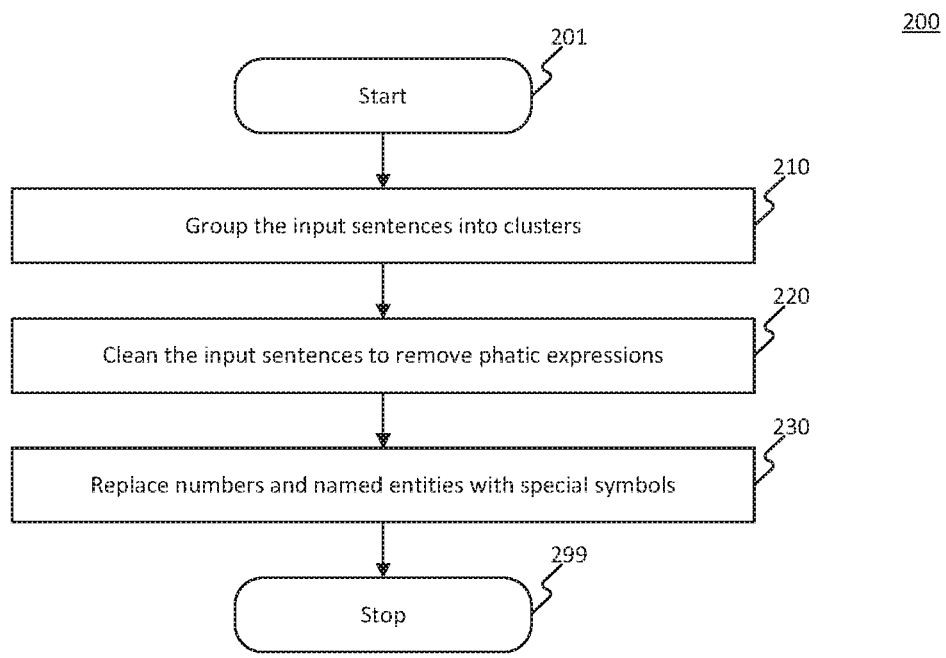
FIG. 2 is a flowchart showing an exemplary method for pre-processing input sentences, consistent with embodiments of the present disclosure.

FIG. 2 is a flowchart showing an exemplary method 200 for pre-processing input sentences, according to embodiments consistent with the present disclosure. The steps of method 200 can be performed by the paraphrase mining system 100 for purposes of illustration. It is appreciated that the illustrated method 200 can be altered to modify the order of steps and to include additional steps.

Method 200 begins at step 201. In step 210, pre-processor 120 can group input sentences into clusters. Pre-processor 120 can consider grouping only when the number of input sentences is above a specified threshold number. In some embodiments, the paraphrase mining system 100 sets the threshold for grouping sentences based on the available computation capacity. The threshold can also depend on the total number of words of the group of sentences and the average number of words per input sentence. Pre-processor 120 can group the sentences into compatible groups capable of being aligned. The compatibility of the sentences can depend on the number of similar words between input sentences of the compatible group. The pre-processor 120 can store the clusters of input sentences in input sentences store 110. The paraphrase mining system 100 can request new input sentences to be grouped with an existing cluster of input sentences stored in input sentences store 110. In some embodiments, pre-processor 120 can group a new sentence with previously prepared cluster of input sentences only if it is compatible with sentences in the cluster. Otherwise, the new sentence can form a new cluster. An input sentence can be compatible with one or more groups of sentences. A single sentence can be itself a cluster forming a singleton cluster. Such singleton clusters may not need any further processing. Pre-processor 120 may calculate a compatibility score of each input sentence with a group to determine the best compatible group. In some embodiments, the compatible group identification results in splitting the previously formed cluster of input sentences into one or more new groups of sentences.

In step 220, pre-processor 120 can clean the sentences by removing the phatic expressions. Phatic expressions are those parts of the sentences which do not add additional meaning to the sentence but are only meant as a social function. For example, "Excuse me" and "All right" may be individual sentences or parts of sentences included before or after the actual sentence. The phatic expressions can be identified by identifying similar sentences in input sentences store 110 that exclude the words forming the phatic expression. In some embodiments, the phatic expressions appear before the aligned tokens of two sentences signifying their social function. For example, if the two input sentences are "All right. I will get it done by Tuesday evening," and "I will complete it by Tuesday evening" pre-processor 220 can identify the phatic expression "All right" and exclude it before the alignment of the two sentences. In some embodiments, the paraphrase mining system 100 maintains a list of phatic expressions. Phatic expressions identified in step 220 may be added to the list of phatic expressions. Paraphrase mining system 100 can store the list of phatic expressions in input sentences store 110.

In step 230, pre-processor 120 of paraphrase mining system 100 can identify nouns in the input sentences and replace them with a standard symbol in order to aid in the alignment of input sentences conveying the same intent in references to different named entities. For example, two input sentences, "Paris is one of the most visited cities in Europe," and "Tokyo is one of the most visited cities in Asia" could be transformed by replacing "Paris," "Europe," "Tokyo," and "Asia" with a standard symbol such as "<PLACE>." Replacing nouns with symbols can aid in aligning the two input sentences, which convey similar meaning but refer to different places. In some embodiments, paraphrase mining system 100 can use the same symbol for different kinds of nouns (e.g., places, animals, objects, etc.). Pre-processor 120 can also replace the numbers in an input sentence with a symbol. Pre-processor 120 can store a table of replaced named entities and numbers in input sentences in a table or data store, such as an RDBMS or NRDBMS like those described above. Replacing named entities and numbers in input sentences can avoid considering named entities as paraphrases and, thus, generating incorrect factual sentences from the aligned paraphrases. For example, alignment of sentences "Paris is one of the most visited cities in Europe," and "Tokyo is one of the most visited cities in Asia" without replacement of named entities can result in the alignment of "Paris" and "Tokyo," which would allow generating a new sentence, "Tokyo is one of the most visited cities in Europe." The process for generating new sentences is discussed further below in relation to the description of FIG. 7A. Pre-processor 120, upon completion of step 230, can complete (step 299) the execution of method 200

Figure 3:
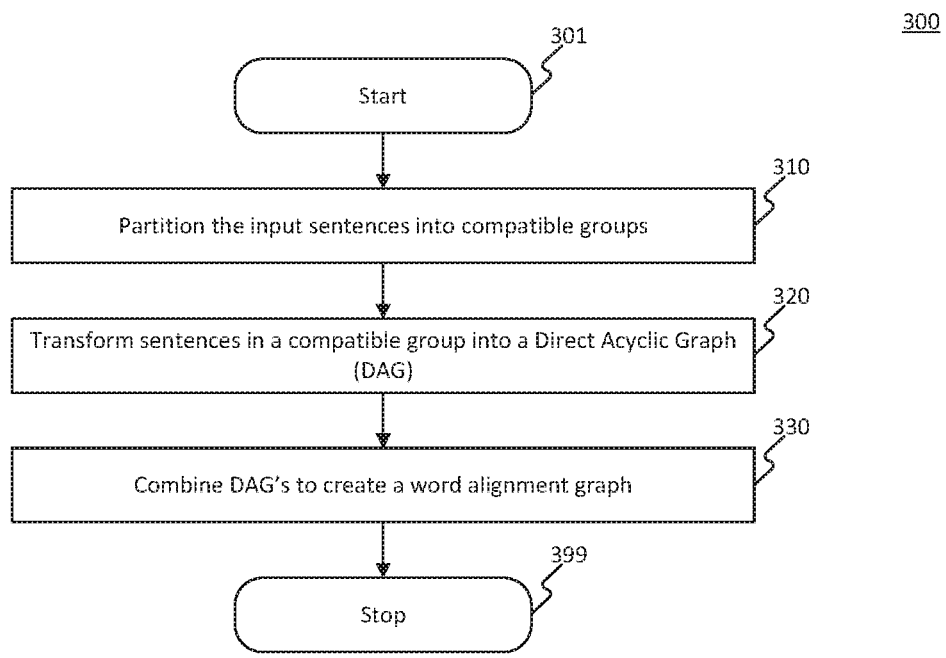
FIG. 3 is a flowchart showing an exemplary method for building a word alignment graph of a set of sentences, consistent with embodiments of the present disclosure.

FIG. 3 is a flowchart showing an exemplary method 300 for building a word alignment graph, consistent with embodiments of the present disclosure. The steps of method 300 can be performed by paraphrase mining system 100 for the purposes of illustration. It is appreciated that the illustrated method 300 can be altered to modify the order of steps and to include additional steps.

Method 300 begins at step 301. In step 310, word alignment graph generator 140 can group input sentences into compatible groups in order to aid with the alignment and extraction of paraphrases. Word alignment graph generator 140 can determine compatibility between a group of sentences based on various rules. These rules can be based on principles of injectivity, monotonicity, and transitivity.

Word alignment graph generator 140 can determine that two sentences have satisfied injectivity if each word in the first sentence maps to only one word in the second sentence and vice versa. Injectivity does not restrict a first sentence from having additional words which are not mapped to the words in the second sentence and vice versa.

Word alignment graph generator 140 considers satisfaction of monotonicity if the order of mapping between words in a sentence matches the order of the words in other sentences. For example, if word w1 in a first input sentence appears before word w2 in a second input sentence, then the word w1 needs to map to a word before w2 in the second input sentence. Because of the structure or phrasing of some input sentences, the sentences can result in mapped words that appear in different orders among the sentences even though they have the same intent or meaning. Word alignment graph generator 140 can identify these inconsistencies and remove the sentences from the group to ensure they do not disrupt the graph creation. Sentences removed from a group for failing to satisfy monotonicity may be added to a new group or another existing group. By removing these sentences, work alignment graph generator 140 can ensure the consistency of the sentences.

Word alignment graph generator 140 considers satisfaction of transitivity requirement when multiple sentences map to the same words among themselves. For example, if w1 in a first input sentence maps to w2 in a second input sentence and w2 in the second input sentence maps to w3 in a third input sentence, then w1 must either have no mappings in the third sentence or it must also map to w3 to be considered transitive. If not, the sentences are not considered transitive and, therefore, can be considered incompatible. Similar to injectivity, monotonicity and transitivity requirements do not require that every word in each sentence is mapped to words in other compatible sentences.

If the above requirements, injectivity, monotonicity, and transitivity are present in a set of sentences, word alignment graph generator 140 can consider the sentences compatible. These requirements can ensure that the resulting graph generated by word alignment graph generator 140 is compact or forms a DAG.

Word alignment graph generator 140 allows a single input sentence to be part of only one compatible group. When a set of sentences is considered compatible, they can be removed from the set of available sentences. The compatibility of a sentence is determined across all available sentences. In some embodiments, the compatible groups are updated based on new sets of input sentences.

Figure 6A:
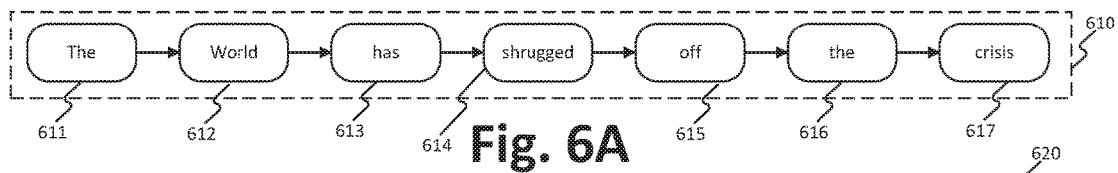
FIG. 6A-C are examples of word alignment, consistent with embodiments of the present disclosure.

In step 320, word alignment graph generator 140 can create DAGs of compatible sentences by first transforming each sentence into a line graph. The transformation of an input sentence into a line graph can require splitting the sentence into tokens identified by word aligner 130 and then creating nodes for each of the identified tokens. The tokens can include certain words replaced by symbols, as discussed above in reference to method 200. An example line graph is shown in FIG. 6A and described in more detail below.

A DAG of two input sentences in a compatible group can be constructed by first identifying the common tokens between the two input sentences. Tokens in a sentence that have no matching tokens in the other sentence are considered paraphrases that can be used interchangeably. In some embodiments, a sequence of tokens (also called a SPAN) in each sentence that does not have a match can be considered paraphrases that can be used interchangeably. Word alignment graph generator 140 can also reapply the rules for compatibility while aligning sentences.

In step 330, word alignment graph generator 140 combines various DAGs within a compatible group generated in step 320 into a single, combined DAG. Word alignment graph generator 140 can include a start and stop node before at the beginning and end, respectively, of the graph. Word alignment graph generator 140, upon completion of step 300, completes (step 399) the execution of method 300.

Figure 4:
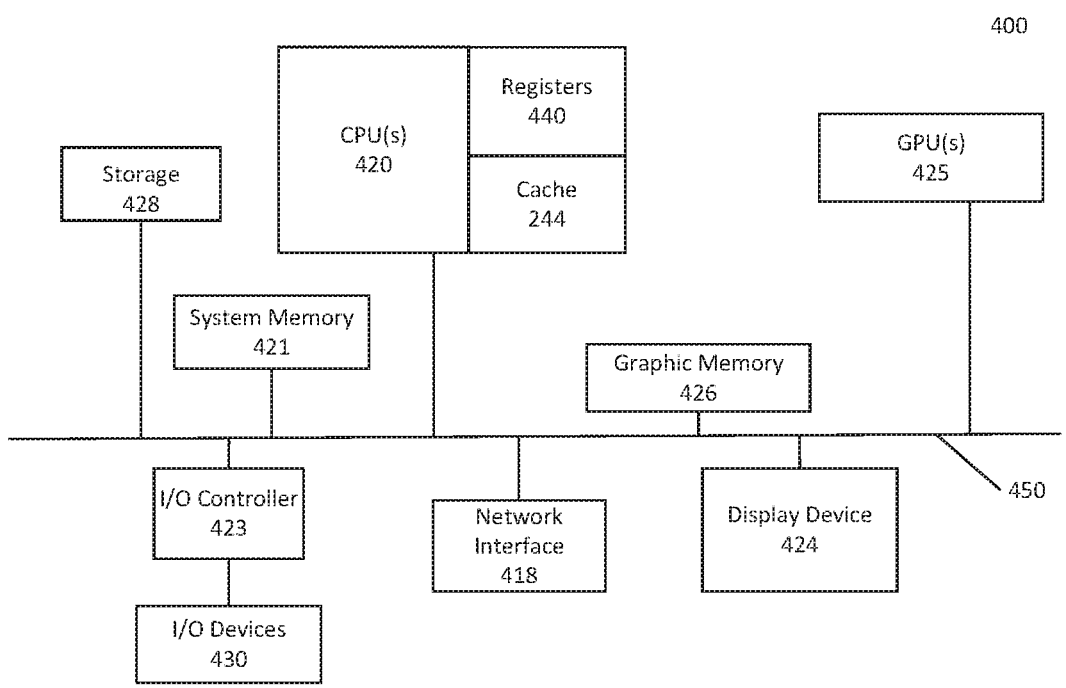
FIG. 4 is a block diagram of an exemplary computing device, consistent with embodiments of the present disclosure.

FIG. 4 is a block diagram of an exemplary computing device 400, consistent with embodiments of the present disclosure. In some embodiments, computing device 400 can be a specialized server providing the functionality described herein. In some embodiments, components of paraphrase mining system 100, such as input sentences store 110, pre-processor 120, word aligner 130, word alignment graph generator 140, and word alignment DAG store 150 can be implemented using the computing device 400 or multiple computing devices 400 operating in parallel. Further, the computing device 400 can be a second device providing the functionality described herein or receiving information from a server to provide at least some of the described functionality. Moreover, the computing device 400 can be an additional device or devices that store or provide data consistent with embodiments of the present disclosure and, in some embodiments, computing device 400 can be a virtualized computing device such as a virtual machine, multiple virtual machines, or a hypervisor.

Computing device 400 can include one or more central processing units (CPUs) 420 and a system memory 421. Computing device 400 can also include one or more graphics processing units (GPUs) 425 and graphic memory 426. In some embodiments, computing device 400 can be a headless computing device that does not include GPU(s) 425 or graphic memory 426.

CPUs 420 can be single or multiple microprocessors, field-programmable gate arrays, or digital signal processors capable of executing sets of instructions stored in a memory (e.g., system memory 421), a cache (e.g., cache 441), or a register (e.g., one of registers 440). CPUs 420 can contain one or more registers (e.g., registers 440) for storing various types of data including, inter alia, data, instructions, floating-point values, conditional values, memory addresses for locations in memory (e.g., system memory 421 or graphic memory 426), pointers and counters. CPU registers 440 can include special-purpose registers used to store data associated with executing instructions such as an instruction pointer, an instruction counter, or a memory stack pointer. System memory 421 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 421 can be one or more memory chips capable of storing data and allowing direct access by CPUs 420. System memory 421 can be any type of random-access memory (RAM), or other available memory chip capable of operating as described herein.

CPUs 420 can communicate with system memory 421 via a system interface 450, sometimes referred to as a bus. In embodiments that include GPUs 425, GPUs 425 can be any type of specialized circuitry that can manipulate and alter memory (e.g., graphic memory 426) to provide or accelerate the creation of images. GPUs 425 can have a highly parallel structure optimized for processing large, parallel blocks of graphical data more efficiently than general-purpose CPUs 420. Furthermore, the functionality of GPUs 425 can be included in a chipset of a special purpose processing unit or a co-processor.

CPUs 420 can execute programming instructions stored in system memory 421 or other memory, operate on data stored in memory (e.g., system memory 421), and communicate with GPUs 425 through the system interface 450, which bridges communication between the various components of the computing device 400. In some embodiments, CPUs 420, GPUs 425, system interface 450, or any combination thereof, are integrated into a single chipset or processing unit. GPUs 425 can execute sets of instructions stored in memory (e.g., system memory 421), to manipulate graphical data stored in system memory 421 or graphic memory 426. For example, CPUs 420 can provide instructions to GPUs 425, and GPUs 425 can process the instructions to render graphics data stored in the graphic memory 426. Graphic memory 426 can be any memory space accessible by GPUs 425, including local memory, system memory, on-chip memories, and hard disk. GPUs 425 can enable displaying of graphical data stored in graphic memory 426 on display device 424 or can process graphical information and provide that information to connected devices through network interface 418 or I/O devices 430.

Computing device 400 can include a display device 424 and input/output (I/O) devices 430 (e.g., a keyboard, a mouse, or a pointing device) connected to I/O controller 423. I/O controller 423 can communicate with the other components of computing device 400 via system interface 450. It should now be appreciated that CPUs 420 can also communicate with system memory 421 and other devices in manners other than through system interface 450, such as through serial communication or direct point-to-point communication. Similarly, GPUs 425 can communicate with graphic memory 426 and other devices in ways other than system interface 450. In addition to receiving input, CPUs 420 can provide output via I/O devices 430 (e.g., through a printer, speakers, bone conduction, or other output devices).

Furthermore, the computing device 400 can include a network interface 418 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 418 can comprise a built-in network adapter, network interface card, PCMCIA network card, card bus network adapter, wireless network adapter, USB network adapter, modem or any other device suitable for interfacing the computing device 400 to any type of network capable of communication and performing the operations described herein.

Figure 5:
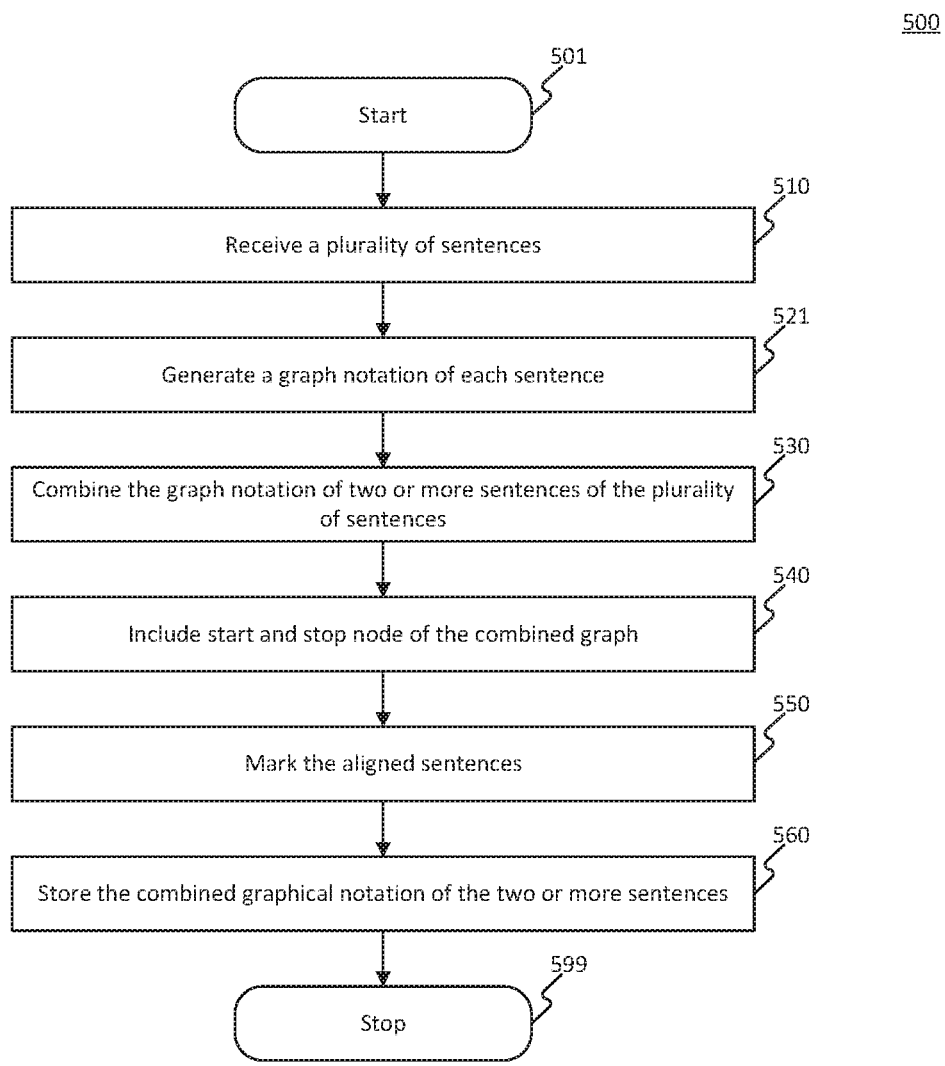
FIG. 5 is a flowchart showing an exemplary method for word alignment, consistent with embodiments of the present disclosure.

FIG. 5 is a flowchart showing an exemplary method 500 for paraphrase mining, consistent with embodiments of the present disclosure. The steps of method 500 can be performed by paraphrase mining system 100 of FIG. 1 executing on or otherwise using the features of computing device 400 of FIG. 4 for purposes of illustration. It is appreciated that the illustrated method 500 can be altered to modify the order of steps and to include additional steps.

In step 510, paraphrase mining system 100 can receive a plurality of sentences. Paraphrase mining system 100 can receive the input sentences over a network at, for example, network interface 418. If not received from input sentences store 110, paraphrase mining system 100 can store the plurality of input sentences in input sentences store 110, which can be present in, for example, storage 428. Paraphrase mining system 100 can further pre-process the received input sentences using pre-processor 120 prior to storing them in the input sentences store 110. The pre-processing steps can include one or more of the steps defined in the method 200 above.

In step 520, the paraphrase mining system 100 can generate a graph of each of the received input sentences. The graph of an input sentence can be a line graph, as described in method 300 above. The paraphrase mining system 100 can update the named entities and numbers within the input sentence to common symbols for alignment purposes, as described in step 230 of method 200 above.

In step 530, the paraphrase mining system 100 can combine the graphs of the input sentences to form one or more DAGs. The paraphrase mining system 100 can identify compatible sentences prior to combining them to form DAGs. The compatibility of input sentences can be based on rules described in step 310 of method 300 above (e.g., injectivity, monotonicity, and transitivity). The paraphrase mining system 100 may then combine multiple DAGs to create a combined graph of the compatible group of sentences.

In step 540, paraphrase mining system 100 can add start and stop nodes to the combined graph of the compatible group of sentences. The start node may be added prior to the first common token between the combined sentences. The stop node may be added after the last common token In step 550, paraphrase mining system 100 can mark a compatible group of sentences forming a combined DAG as an aligned set of sentences. Marking a sentence can also include a compatibility score of the sentence in relation to other sentences in the group. In some embodiments, the marking step also includes generating an alignment score. Paraphrase mining system 100 can consider a set of marked sentences for regrouping when a new set of input sentences are introduced. The marking of the aligned sentences can be temporary while the current set of input sentences are being processed.

In step 560, paraphrase mining system 100 can store the combined graph of two or more sentences generated in step 540 in word alignment DAG store 150. Paraphrase mining system 100, upon completion of step 560, completes (step 599) executing method 500 on computing device 400.

Figure 6B:
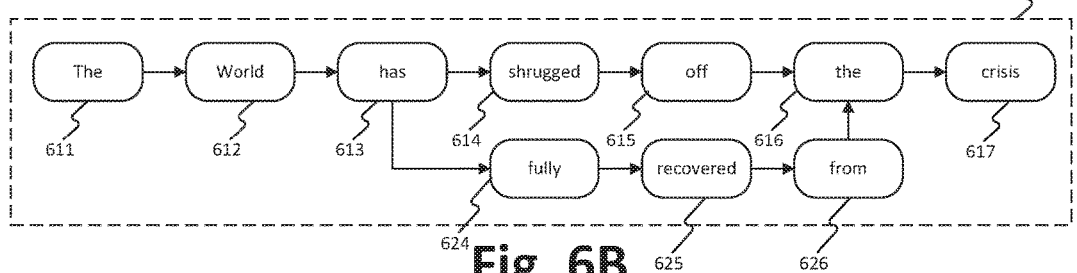
Figure 6C:
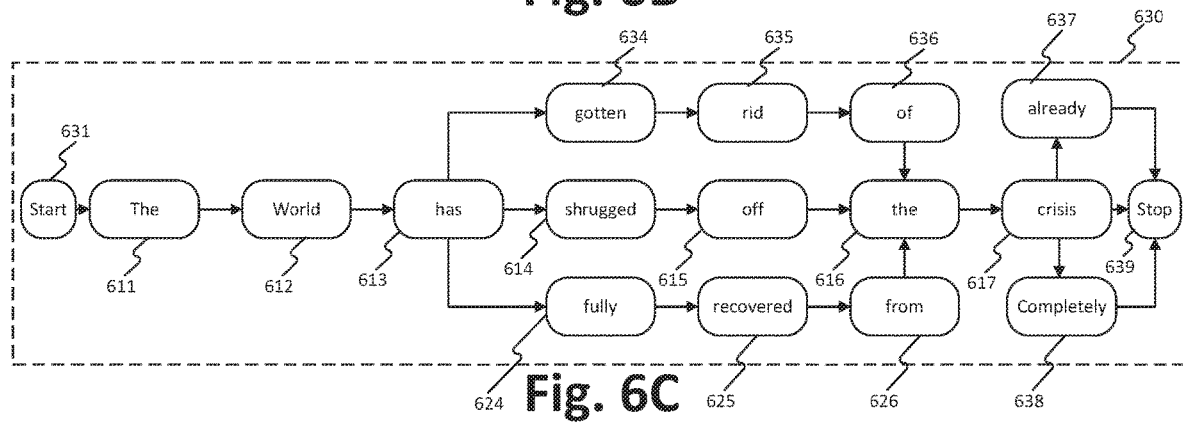

FIG. 6A-C are examples of world alignment of a single sentence, aligned sentences, and a combined group of sentences. The figures show example sentences with tokens represented by nodes in a graph. The edges of a node connect a token to the previous and subsequent tokens in the sentence. FIG. 6A illustrates a single input sentence "The world has shrugged off the crisis" using a line graph 610. Each sentence in a compatible group, as identified by word alignment graph generator 140 and described in step 310 of method 300, can be transformed into a line graph.

FIG. 6B illustrates a DAG 620 of two input sentences with mapped tokens. The common tokens between the two sentences can be represented using a single set of nodes with one node for each common token. This can be accomplished by combining or merging the nodes representing common or matching tokens into a single, combined graph node while preserving edge connections to other nodes in the graph. The non-common or non-matching tokens between the two input sentences are shown separately as separate nodes. While the individual words within the tokens may not have a common meaning, the paraphrases represented by the non-common tokens can convey the same meaning and thus can be used interchangeably. For example, the paraphrases "shrugged off the" (e.g., illustrated by nodes 614, 615 and 616) and "fully recovered from" (e.g., illustrated by nodes 624, 625, and 626) can be used interchangeably. In some embodiments, a single token may only include a single word. In some embodiments, the sequence of tokens may include common tokens and/or words. The common tokens between the input sentences can match the order and position within the paraphrases. For example, the paraphrases "fully recovered from" (e.g., illustrated by nodes 624, 625, and 626) and "fully recouped from" (not shown in the figure) have matching tokens "fully" and "from" between both paraphrases.

FIG. 6C illustrates a combined DAG 630 of multiple sentences with the identified paraphrases between common nodes 613 and 617. The combined DAG 630 can include additional tokens (e.g., nodes 637 and 638) after the last common node 617. These tokens can be considered as optional tokens to be used in other sentences generated using the identified paraphrases. The additional nodes 637 and 638 and the last common node 617 are connected to the stop node 639, indicating that the additional tokens can be optional. Similar to FIG. 6B, the phrases between common tokens (e.g. common tokens 613 and 617) can be used interchangeably. The common tokens include start node 631 and stop node 639. For example, in DAG 630, the phrases "crisis" (e.g., represented by node 617), "crisis already" (e.g., represented by nodes 617 and 637), and "crisis completely" (e.g., represented by nodes 617 and 638), can be used interchangeably. In some embodiments, only the non-matching portions of phrases may be evaluated to be either used interchangeably or marked optional. For example, "already" (e.g., represented by node 637) and "completely" (e.g., represented by node 638) may be considered optional, and the sentences may be formed without these words. The set of phrases between nodes 613 and 617 and 617 and 639 can be combined to form a new set of sentences not provided to paraphrase mining system 100. Generation of new sentences using paraphrase mining system 100 is discussed further in relation to FIG. 7A below.

FIG. 7A illustrates an exemplary use case for using a natural language processing system 700 for training a machine learning model, consistent with embodiments of the present disclosure. The use case scenario includes natural language processing system 700 for training a system about one or more languages using user provided and automatically generated sentences.

As illustrated in FIG. 7A, natural language processing system 700 can include word alignment DAG store 150 of the paraphrase mining system 100. In some embodiments, the paraphrase mining system 100 may be included in the natural language processing system 700. The paraphrase mining system 100 may be adapted to act as a natural language processing system 700. Natural language processing system 700 can also include paraphrase miner 710. Paraphrase miner 710 can identify paraphrases to use to generate new sentences to train the machine learning model 720 of natural language processing system 700. Machine learning model 720 can communicate with paraphrase generator 711 over network 730. In some embodiments, machine learning model 720 can be generated on the same computing device (e.g., computing device 400 of FIG. 4) executing paraphrase miner 100. Natural language processing system 700 can train machine learning model 720 with multiple phrases having similar meaning using paraphrase miner 710.

The output generated by the word alignment graph generator 140 of the paraphrase mining system 100 can be used as an input to the natural language processing system 700. Paraphrase mining system 100 can include paraphrase generator 711 and paraphrase filter 712. In some embodiments paraphrase miner 710 can be separate from paraphrase mining system 100. Paraphrase generator 711 takes the word aligned DAGs stored in a word alignment DAG store 150 to generate paraphrases. The paraphrase generator may generate a new paraphrase by following a path from a start node to a stop node for the word aligned DAGs. For example, paraphrase generator 711 can use DAG 630 of FIG. 6C as input. Paraphrase generator 711 can begin traversing DAG 630 at start node 631 and follow any of the paths to stop node 639. The traversal of DAG 630 requires all nodes to be connected by edges, and paraphrase generator 711 can generate all possible phrases by visiting every node of the directed acyclic graph stored in the word alignment DAG store 150. In some embodiments, the paraphrases generated by paraphrase generator 711 can be stored in word alignment DAG store 150 or other similar database stores. The generated paraphrases may be stored in the word alignment DAG store 150 in databases or tables separated from the databases and tables used to store the direct acyclic graphs generated by word alignment graph generator 140 and described in method 300 of FIG. 3. In some embodiments, the paraphrase generator 711 submits the paraphrase or set of paraphrases to a paraphrase filter 712 to review the generated paraphrases. Paraphrase filter 712 can filter phrases that are factually inaccurate as described in step 230 of method 200 of FIG. 2.

Paraphrase miner 710 can be connected to the paraphrase mining system 100 over network 730. The paraphrases generated by paraphrase miner 710 can be supplied to the machine learning model 720 over network 730. In some embodiments paraphrase miner 710 and paraphrase mining system 100 can coexist on the same computing device (e.g., computing device 400 of FIG. 4) without requiring a network for communication. Paraphrase miner 710 may be a variation of the implemented paraphrase mining system 100. The paraphrase miner 710 may group and/or store the sentences identified for training the machine learning model 720 as training data source 740. The training data source 740 may be present in temporary storage or persisted for future use. Several ways of populating training data source 740 are described below.

The described paraphrase generation can be triggered by a request for alignment of new input sentences sent to the paraphrase mining system 100. In some embodiments, the paraphrase generation can be requested at periodic intervals by natural language processing system 700.

The natural language processing system 700 can be utilized to generate a corpus of sentences to further train the paraphrase mining system 100. Given a set of input sentences, the natural language processing system 700 can generate a set of new paraphrased sentences and increase the amount of our training data for the paraphrase mining system 100. Such a new dataset of sentences can be simply created by mixing and matching phrases from the input sentences already present in the input sentence store 110 and processed by paraphrase mining system 100. The generated corpus of sentences may be included in the training data source 740 and used to train the machine learning model 720.

In some embodiments, the natural language processing system 700 may help create a new training dataset (as opposed to enriching the existing dataset with new combinations of paraphrases as described above). In this case, the paraphrases identified using paraphrase mining system 100 may be used to collect more data for the training data source 730 and supplied later to train the machine learning model 720. For example, if paraphrase mining system 100 discovers that "Uber" can be a paraphrase for "Taxi," the natural language processing system 700 may go and fetch sentences mentioning "Uber" from the web to train the machine learning model 720 that needs to handle transportation requests. The paraphrases identified by the paraphrase mining system 100 can thus aid in training the machine learning model 720 of natural language processing system 700 in a targeted manner or focus on a certain domain of business.

In some embodiments, the paraphrase mining system 100 (in particular the paraphrase filter 712) may identify optional phrases (which do not qualify as paraphrases) and clean the input sentences and remove these optional phrases. Such a data cleaning step can help provide higher quality data to machine learning model 720.

FIG. 7B illustrates a use case scenario of an exemplary paraphrase mining system 100 interaction by users of user devices. The use case scenario includes a question and answer ("Q & A") system 750 for responding to questions from user devices using phrases mined by paraphrase mining system 100.

As illustrated in FIG. 7B, the Q & A system 750 may include a paraphrase miner 710 to generate responses to the questions. The Q & A system 750 may also include user devices 760 connected to the paraphrase miner 710, as described in FIG. 7A above to retrieve phrases that can be used to respond to the questions sent from user devices 760. The user devices 760 can be connected to the paraphrase miner 710 over a network 730. Network 730 can be a wired or a wireless network and can also connect with a paraphrase mining system such as paraphrase mining system 100 of FIG. 1. In some embodiments, Q & A system 750 can include paraphrase mining system 100. User devices 760 can connect to paraphrase miner 710 over the Internet. User devices 760 can include, for example, mobile devices 761 and desktop device 762. Other types of user devices can also be used.

Paraphrase miner 710 can generate paraphrases for responding to questions by accessing word-aligned input sentences stored as directed acyclic graphs (DAGs) in the word alignment DAG store 150 of paraphrase mining system 100. Paraphrase miner 710 can, among other things, be part of paraphrase mining system 100, connected to the paraphrase mining system 100 over the network 730, or communicate directly with paraphrase mining system 100. In some embodiments, paraphrase mining system 100 can call paraphrase miner 710 to identify the possible paraphrases of the aligned input sentences as part of the alignment process.

Q & A system 750 can use paraphrases generated using paraphrase miner 710 to respond to questions from user devices 760. The identification of the right response can include alignment of questions from the user devices 760 with sentences generated using new phrases mined by paraphrase miner 710 or paraphrase mining system 100. The input sentences best aligning with the questions can be used to identify appropriate responses to the questions. The alignment process can follow the same steps described above for method 500 of FIG. 5. In some embodiments, Q & A system 750 can use features of natural language processing system 700 of FIG. 7A to further identify potential responses to the questions from user devices 760. The relationships between the replacing symbols or tokens and the replacing named entities created by pre-processor 120 can be used to retrieve the named entities to be used in responses to questions sent to the Q & A system 750.

In the Q & A system 750, a new set of questions with tokens matching the previously responded questions can be identified by the paraphrase mining system 100. The responses prepared for such questions with matching paraphrases may be utilized to prepare responses to the new questions. The prepared responses can directly use the responses to the previously responded questions or may form part of the new responses prepared for the latest questions.

The exemplary paraphrases mining system 100 can be part of other systems similar to question and answer system 750. The same Q & A system 750 can be used for different applications. The other applications can include a search engine. For example, the paraphrase mining system 100 that may have identified that the tokens "rentals" and "apartments" are paraphrases that can be used interchangeably, then a search for "cheap rentals in SF" maybe expand by the paraphrase mining system 100 acting as a search engine or part of a search engine to return any document/result that mentions "apartments" as well as "rentals." Such query expansion and output using the paraphrase mining system 100 can be achieved by finding matching paraphrases.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by a paraphrase mining system that includes one or more processors to cause the paraphrase mining system to perform a method for aligning pairs of sentences, the method comprising:
   receiving a plurality of sentences;
   determining a group of compatible sentences from the received plurality of sentences based on a first threshold value, wherein a value indicating compatibility between sentences in the group of compatible sentences is above the first threshold value;
   generating a graph for each of at least two sentences of the group of compatible sentences, wherein generating a graph for each sentence of the at least two sentences comprises:
   identifying one or more tokens for the sentence; and
   connecting via edges the one or more tokens;
   generating a combined graph for the at least two sentences wherein generating a combined graph comprises:
      aligning the identified tokens of the at least two sentences of the group of compatible sentences based on word embeddings of the identified tokens generated using a neural network;
      identifying matching and non-matching tokens between the at least two sentences based on the alignment, wherein alignment is above a second threshold value;
      merging matching tokens into a combined graph node; and
   determining interchangeable paraphrases based on non-matching tokens between the merged tokens of the combined graph.

2. The non-transitory computer readable storage medium of claim 1, wherein generating a combined graph for the at least two sentences further comprises:
   determining compatibility among the at least two sentences; and
   removing sentences from the at least two sentences based on the compatibility determination.

3. The non-transitory computer readable storage medium of claim 2, wherein determining compatibility among the at least two sentences comprises:
   determining injectivity among the at least two sentences;
   determining monotonicity among the at least two sentences; and
   determining transitivity among the at least two sentences.

4. The non-transitory computer readable storage medium of claim 3, wherein determining monotonicity among the at least two sentences further comprises:
   determining a consistency among the at least two sentences; and removing sentences from the at least two sentences based on the consistency determination.

5. The non-transitory computer readable storage medium of claim 1, wherein determining a group of compatible sentences from the received plurality of sentences based on a first threshold value further comprises:
determining an intent of each sentence in the received plurality sentences; and
grouping each sentence in the received plurality of sentences into clusters wherein sentences in a cluster share the intent.

6. The non-transitory computer readable storage medium of claim 1, wherein generating a combined graph for the at least two sentences further comprises:
determining an intent of tokens in the at least two sentences; and
identifying a set of non-matching tokens between the at least two sentences based on the alignment wherein the non-matching tokens in the set share the intent.

7. The non-transitory computer readable storage medium of claim 6, wherein the non-matching tokens are paraphrases with one or more words that can be used interchangeably.

8. The non-transitory computer readable storage medium of claim 7, wherein non-aligned tokens are phatic expressions.

9. The non-transitory computer readable storage medium of claim 7, wherein the phatic expressions in each sentence of the two or more sentences are removed before generating a combined graph.

10. The non-transitory computer readable storage medium of claim 9, wherein the phatic expressions are added to the combined graph notation of the two more sentences after aligning the identified tokens.

11. The non-transitory computer readable storage medium of claim 1, further comprises:
generating a new sentence from the matching tokens and a subset of the non-matching tokens.

12. The non-transitory computer readable medium of claim 11, wherein the new sentence is generated as a response to a question.

13. A method performed by a paraphrase mining system for aligning pairs of sentences, the method comprising:
receiving a plurality of sentences;
determining a group of compatible sentences from the received plurality of sentences based on a first threshold value, wherein a value indicating compatibility between sentences in the group of compatible sentences is above the first threshold value;
generating a graph for each of at least two sentences of the group of compatible of sentences, wherein generating a graph for each sentence of the at least two sentences comprises:
identifying one or more tokens for the sentence; and
connecting via edges the one or more tokens;
generating a combined graph for the at least two sentences wherein generating a combined graph comprises:
aligning the identified tokens of the at least two sentences of the group of compatible sentences based on word embeddings of the identified tokens generated using a neural network;
identifying matching and non-matching tokens between the at least two sentences based on the alignment, wherein alignment is above a second threshold value;
merging matching tokens into a combined graph node; and
determining interchangeable paraphrases based on non-matching tokens between the merged tokens of the combined graph.

14. The method of claim 13, wherein generating a combined graph for the at least two sentences further comprises:
determining compatibility among the at least two sentences; and
removing sentences from the at least two sentences based on the compatibility determination.

15. The method of claim 14, wherein determining compatibility among the at least two sentences comprises:
determining injectivity among the at least two sentences;
determining monotonicity among the at least two sentences; and
determining transitivity among the at least two sentences.

16. The method of claim 13, wherein generating a combined graph for the at least two sentences further comprises:
determining a consistency among the at least two sentences; and
removing sentences from the at least two sentences based on the consistency determination.

17. A paraphrase mining system comprising:
one or more memory devices storing processor executable instructions; and
one or more processors configured to execute the instructions to cause the paraphrase mining system to perform:
receiving a plurality of sentences;
determining a group of compatible sentences from the received plurality of sentences based on a first threshold value, wherein a value indicating compatibility between sentences in the group of compatible sentences is above the first threshold value;
generating a graph for each of at least two sentences of the group of compatible of sentences, wherein generating a graph for each sentence of the at least two sentences comprises:
identifying one or more tokens for the sentence; and
connecting via edges the one or more tokens;
generating a combined graph for the at least two sentences wherein generating a combined graph comprises:
aligning the identified tokens of the at least two sentences of the group of compatible sentences based on word embeddings of the identified tokens generated using a neural network;
identifying matching and non-matching tokens between the at least two sentences based on the alignment, wherein alignment is above a second threshold value;
merging matching tokens into a combined graph node; and
determining interchangeable paraphrases based on non-matching tokens between the merged tokens of the combined graph.

18. The system of claim 17, wherein the one or more processors are configured to execute the instructions to cause the paraphrase mining system to further perform:
determining an intent of each sentence in the received plurality sentences; and
grouping each sentence in the received plurality of sentences into clusters wherein sentences in a cluster share the intent.

19. The system of claim 17, wherein the one or more processors are configured to execute the instructions to cause the paraphrase mining system to further perform:
determining an intent of tokens in the at least two sentences.

20. The system of claim 17, wherein the one or more processors are configured to execute the instructions to cause the paraphrase mining system to further perform:
    generating a new sentence from the matching tokens and a subset of the non-matching tokens.

* * * * *